United States Patent [19]

Hori et al.

[11] Patent Number: 5,315,441
[45] Date of Patent: May 24, 1994

[54] INVERSE TELEPHOTO LARGE APERTURE WIDE ANGLE LENS

[75] Inventors: Kenji Hori, Tokyo; Wataru Tatsuno, Yokohama, both of Japan

[73] Assignee: Nikon Corporation, Tokyo, Japan

[21] Appl. No.: 120,189

[22] Filed: Sep. 13, 1993

Related U.S. Application Data

[63] Continuation of Ser. No. 998,621, Dec. 30, 1992, abandoned.

[30] Foreign Application Priority Data

Jan. 16, 1992 [JP] Japan .................... 4-005862

[51] Int. Cl.5 .............................. G02B 13/04
[52] U.S. Cl. .................... 359/753; 359/781; 359/823; 359/686
[58] Field of Search ........... 359/753, 781, 748, 782, 359/783, 822, 823, 686, 684, 680

[56] References Cited

U.S. PATENT DOCUMENTS

| | | | |
|---|---|---|---|
| 3,771,853 | 11/1973 | Nakamura | 359/686 |
| 3,923,369 | 12/1975 | Nakamura | 359/823 |
| 4,390,252 | 6/1983 | Mori | 359/823 |
| 4,516,839 | 5/1985 | Tokumara | 359/686 |
| 4,653,873 | 3/1987 | Kawamura | 359/686 |
| 4,687,302 | 8/1987 | Ikemori et al. | 359/686 |
| 4,759,617 | 7/1988 | Tokomura et al. | 359/686 |
| 4,846,562 | 7/1989 | Tokumaru et al. | 359/686 |
| 5,078,481 | 1/1992 | Nakayama et al. | 359/680 |
| 5,132,848 | 7/1992 | Nishio et al. | 359/686 |

FOREIGN PATENT DOCUMENTS

| | | |
|---|---|---|
| 54-30290 | 3/1976 | Japan . |
| 57-35821 | 2/1982 | Japan . |
| 62-249119 | 10/1987 | Japan . |
| 1-134411 | 5/1989 | Japan . |

*Primary Examiner*—Loha Ben
*Attorney, Agent, or Firm*—Shapiro and Shapiro

[57] ABSTRACT

An inverse telephoto large aperture wide angle lens comprises a first lens group with a negative refractive power, a second lens group with a positive refractive power, a stop, a third lens group with a negative refractive power, and a fourth lens group with a positive refractive power arranged in the named order from a side of an object, in which for focusing on a near object from infinity the first lens group is fixed with respect to an image surface, and the second, third, and fourth lens groups are moved along an optical axis thereof toward the object such that a space between the first lens group and the second group and a space between the second lens group and the third lens group decrease, but a space between the third lens group and the fourth lens group increases.

6 Claims, 8 Drawing Sheets

INVERSE TELEPHOTO LARGE APERTURE WIDE ANGLE LENS

This is a continuation of application Ser. No. 998,621 filed Dec. 30, 1992, now abandoned.

BACKGROUND OF THE INVENTION

1. Field of the Invention

The present invention relates to an inverse telephoto large aperture wide angle lens, and more particularly to a focusing method thereof.

2. Related Background Art

Focusing is usually done in a photographic lens by moving the entire lens system. There are, however, used these days 35 mm single lens reflex cameras having an automatic focusing mechanism, and a focusing part thereof is desired to have a less weight to reduce a load on a lens drive section. An inverse telephoto large aperture wide angle lens has a substantial weight at a diverging lens group nearest to an object because of its structure, and it is desired to conduct the focusing by a part of lens groups excluding the diverging lens group.

There are well known wide angle lenses, which carry out the focusing by moving a part of lens system as described, for example as proposed in Japanese Patent Publication No. 54-30290, Japanese Laid-open Patent Application No. 57-35821, Japanese Laid-open Patent Application No. 62-249119, and Japanese Laid-open Patent Application No. 1-134411.

However, in the wide angle lens as disclosed in Japanese Patent Publication No. 54-30290, the focusing is conducted only by moving intermediate lens groups before the stop, and therefore asymmetry is likely to become greater between a coma below the principal ray and a coma above the principal ray. This causes a difficulty in application to the focusing of a large aperture lens with an f number of about 1.4. In contrast, in the wide angle lens as disclosed in Japanese Laid-open Patent Application No. 57-35821, the focusing is conducted by lens groups behind the stop, and therefore an air gap is necessary for focusing in the groups behind the stop. This causes a difficulty in assuring a sufficient back focus. Further, an effective aperture of the closest lens to an image surface must be increased in order to secure sufficient brightness of the edge of image field, which results in a difficulty in mounting of a large aperture lens with an f number of about 1.4 as an interchangeable lens into a camera body.

Also, the wide angle lens as disclosed in Japanese Laid-open Patent Application No. 62-249119 is suitable for a lens with an f number of about 2.8, but is not suitable for use as a large aperture lens with an f number of about 1.4 because of a large change of astigmatism upon focusing. The wide angle lens as disclosed in Japanese Laid-open Patent Application No. 1-134411 includes a compound lens with a weak refractive power disposed closest to the image field, which results in a difficulty to secure a sufficient back focus. Further, the compound lens closest to the image field is fixed, and therefore an effective aperture of the lens closest to the image field must be increased to prevent a lack of brightness of the edge of image field, which might be caused due to vignetting of peripheral optical fluxes in short range photography. There is a difficulty in mounting between the lens and the camera body in such a case.

SUMMARY OF THE INVENTION

It is, therefore, an object of the present invention to provide an inverse telephoto large aperture wide angle lens suitable for use with a single lens reflex camera, having a wide angle of view at a large aperture ratio while being capable of maintaining an excellent imaging performance even in focusing on a near object.

To achieve the above object, a large aperture wide angle lens according to the present invention comprises a first lens group with a negative refractive power, a second lens group with a positive refractive power, a stop, a third lens group with a negative refractive power, and a fourth lens group with a positive refractive power arranged in the order from an object side, in which for focusing on a near object from infinity the first lens group is fixed with respect to an image surface, and the second, third, and fourth lens groups are moved along an optical axis thereof toward the object such that a space between the first lens group and the second lens group and a space between the second lens group and the third lens group decrease, but a space between the third lens group and the fourth lens group increases.

It is desirable that the following conditions are satisfied for movement for focusing of the second, third, and fourth lens groups moved on the optical axis:

$$\Delta d_2 = \Delta d_4;$$

$$0 < \Delta d_3 / \Delta d_2 < 1.3,$$

where $\Delta d_2$ represents an amount of movement for focusing of the second lens group with respect to an infinity focus, $\Delta d_3$ an amount of movement for focusing of the third lens group with respect to the infinity focus, and $\Delta d_4$ an amount of movement for focusing of the fourth lens group with respect to the infinity focus.

Further, it is effective in the above arrangement that the following conditions are further satisfied:

$$-4 < f_1/f < -2;$$

$$-3 < f_3/f < -1.2;$$

$$0.35 < D_{1,2}/f < 0.65;$$

$$0.35 < D_{2,3}/f < 0.5,$$

where $f_1$ is a focal length of the first lens group, $f_3$ a focal length of the third lens group, $f$ a focal length of overall lens system, $D_{1,2}$ an air space between the first lens group and the second lens group at the infinity focus, and $D_{2,3}$ an air space between the second lens group and the third lens group at the infinity focus.

It is general in the focusing method using an inverse telephoto wide angle lens in which the focusing is conducted by simultaneously moving the entire optical system in short range photography that the astigmatism is excessively corrected and the spherical aberration is insufficiently corrected. It is known that use of a focusing method in which the first group is fixed and a space between the first group and the second group is decreased may relieve the excessive correction of astigmatism to some extent and enhance the correction of spherical aberration. Such a focusing technique may be effective to a dark lens with a large f number, but is not satisfactory in effect for a bright lens with an f number of about 1.4.

Then, the present invention has attained a novel focusing technique in which a negative lens group closest to an object is fixed with respect to an image surface and the other three lens groups as described are moved. The decrease in space between the second and the third lens groups deviates the spherical aberration to the positive and the astigmatism to the negative, and the increase in space between the third and the fourth lens groups deviates the spherical aberration to the negative and the astigmatism to the negative. Thus, the spherical aberration remains unchanged because the positive and the negative deviations cancel each other, but the astigmatism may be largely changed because the negative deviations are added to each other. Accordingly, the astigmatism may be effectively maintained in a proper correction condition, which has been too much corrected in the conventional focusing technique with the first group fixed and the space between the first and the second groups being decreased.

The above condition (1) defines a ratio of movement of the second group to that of the fourth group. It is needless to mention that a finer correction of aberration change at a near distance may be effected by focusing the three groups having a focusing function at respectively different movement ratios. However, the condition (1) defines that the second group and the fourth group always have the same movement amount, which may simplify a structure of lens barrel as compared to the focusing method to move the three groups having the focusing function at different movement ratios.

The condition (2) defines a ratio of movement of the third group to that of the second group. When the respective air gaps among the second, the third, and the fourth groups are changed within the range as defined in this condition, the astigmatism and the coma may be properly corrected. The correction of astigmatism becomes excessive below the lower limit, whereby the correction of the upper coma also becomes excessive, as described above. The correction of astigmatism is insufficient above the upper limit, whereby the correction of the upper coma also becomes insufficient.

In the present invention, it will be further effective to satisfy the conditions (3) to (6). The condition (3) defines a diverging power of the first group. An inverse telephoto wide angle lens for single lens reflex camera generally has a negative lens group closest to an object in the lens to obtain a wide angle of view and a long back focus, whereby having a certain diverging power to enable to obtain an appropriate angle of view and an appropriate back focus. The diverging effect of the first lens group $G_1$ becomes too small below the lower limit of the condition (3), making it difficult to assure a sufficient back focus. The diverging effect of the first lens group $G_1$ becomes too large above the upper limit of the condition so as to increase off-axial aberrations, making it difficult to simultaneously correct the spherical aberration and the off-axis aberrations with the groups other than the first group.

The condition (4) defines a negative refractive power of the third group, which is a condition specifically for proper correction of the spherical aberration. The correction of the spherical aberration is insufficient below the lower limit, while the correction of the spherical aberration becomes excessive above the upper limit. In either case, it becomes difficult to properly correct the spherical aberration even if an aspherical lens is used.

The condition (5) defines the air ga between the first group and the second group. It becomes difficult to obtain an air gap necessary for focusing below the lower limit, while an effective aperture of the first group becomes larger with the increase of the entire length above the upper limit, which is not preferable in respect of handiness and operability. The condition (6) defines the gap between the second group and the third group. Below the lower limit, a ray emitted from on the axis enters the third group after passing through the first and the second groups at a position far from the axis so that the effect of the negative refractive power of the third group is emphasized to make the correction of the spherical aberration excessive. To the contrary, above the upper limit, the entire length becomes larger, and the effective aperture of the fourth group must be increased to prevent the insufficient brightness of the edge of image field caused by the vignetting of the upper optical fluxes of principal ray. As a result, it undesirably becomes difficult to mount the lend onto the camera body.

According to the present invention as described, an inverse telephoto wide angle lens may be attained suitable for use with a single lens reflex camera which may maintain an excellent imaging performance in a short range focusing condition equivalent to that at infinity while having brightness of an aperture ratio of 1:1.4 and a wide angle of view of 74 degrees.

DESCRIPTION OF THE PREFERRED EMBODIMENTS

The following explains preferred embodiments according to the present invention.

Figure 1:
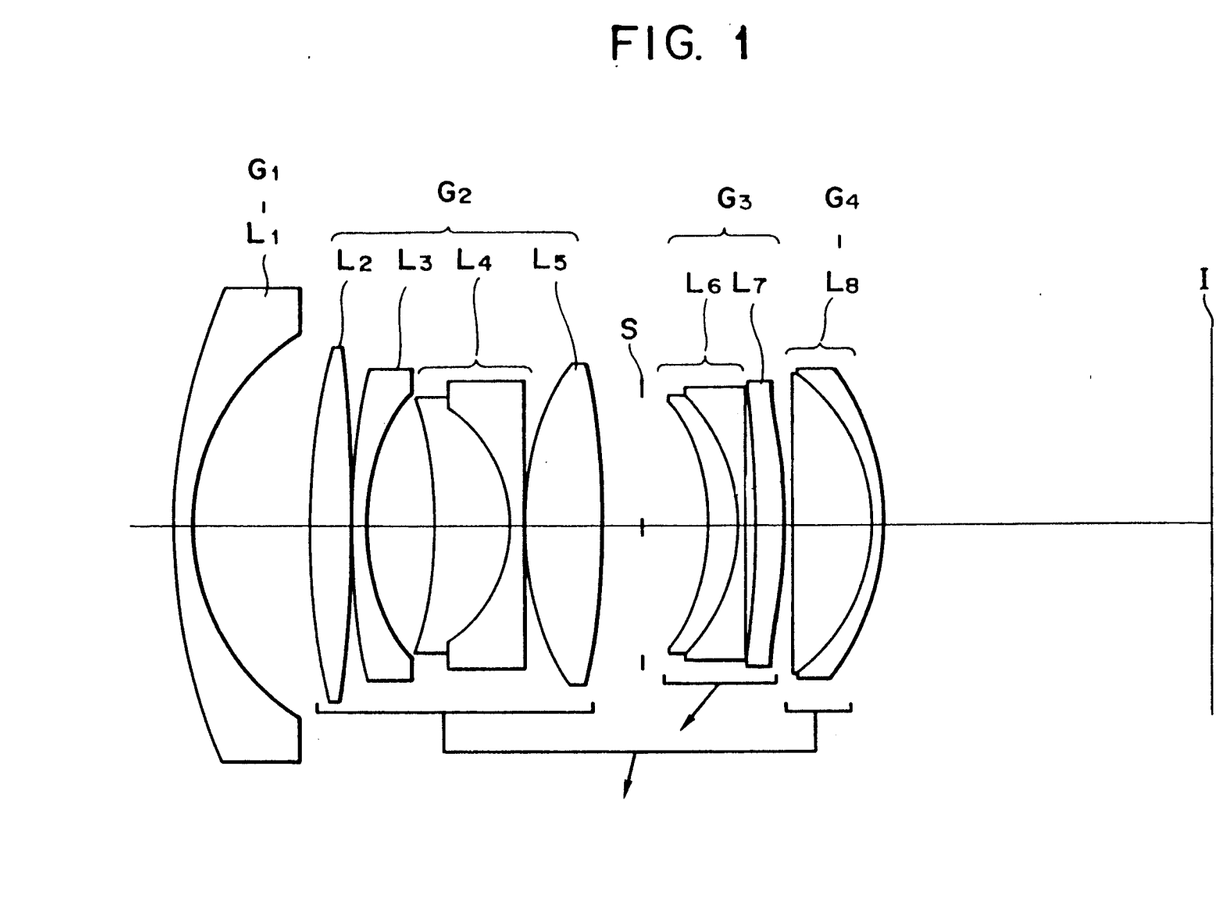
FIG. 1 is a lens constitutional view of the first embodiment according to the present invention.
Figure 5:
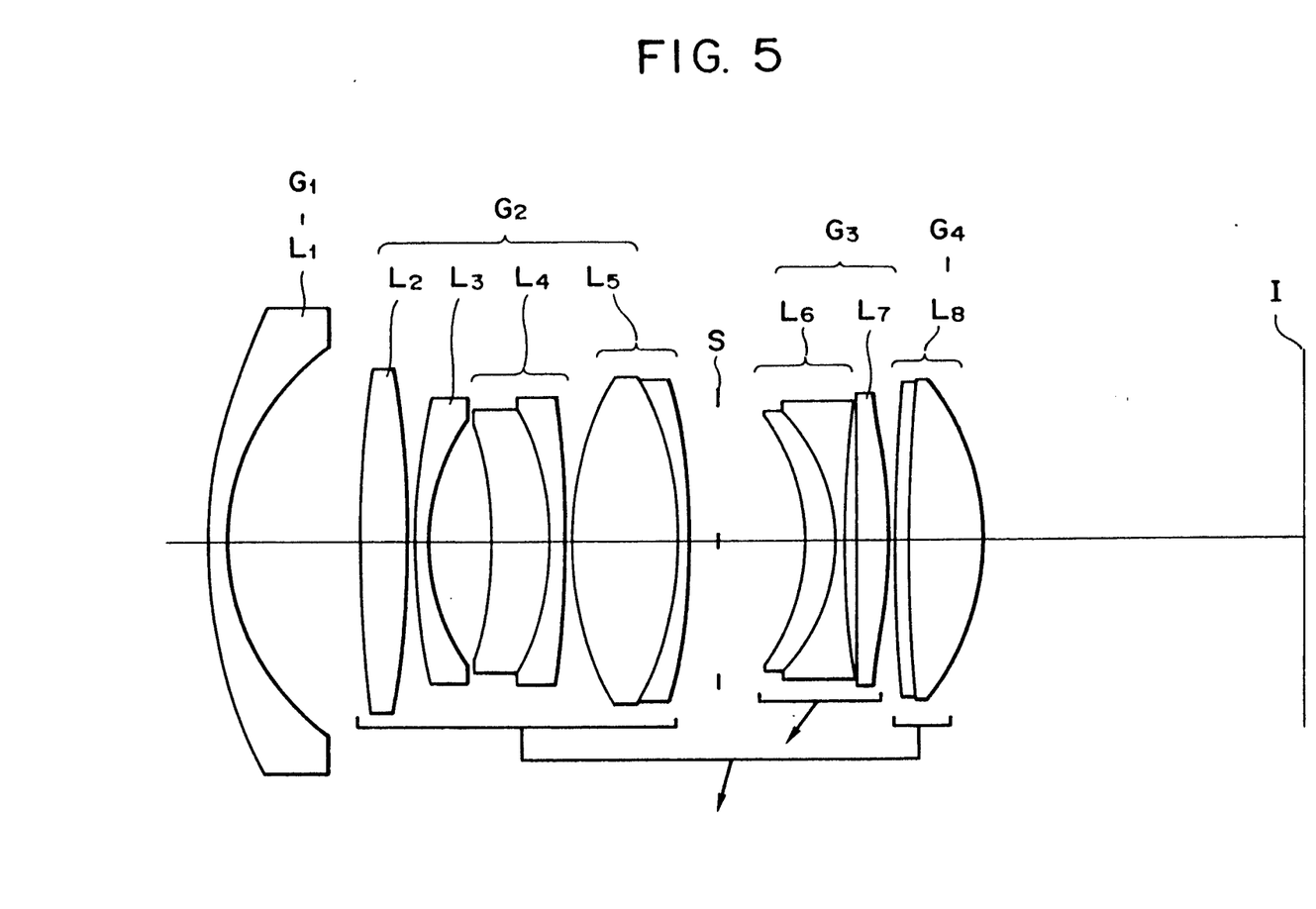
FIG. 5 is a lens constitutional view of the second embodiment according to the present invention.

An inverse telephoto wide angle lens according to the present invention, as shown in lens constitutional drawings of the first and the second embodiments respectively shown in FIG. 1 and FIG. 5, comprises a first lens group $G_1$ with a negative refractive power, a second lens group $G_2$ with a positive refractive power, a stop S, a third lens group $G_3$ with a negative refractive power, and a fourth lens group $G_4$ with a positive refractive power arranged in the named order from a side of an object.

In the embodiments, as shown, in focusing from the infinity focus condition to a near distance focus, the first lens group $G_1$ is fixed with respect to an image surface I, the second lens group $G_2$ and the fourth lens group $G_4$ are moved together toward the object, and the third lens group $G_3$ is moved toward the object at a faster speed than the second and fourth lens groups. The stop S disposed between the second lens group $G_2$ and the third lens group $G_3$ can be moved together with either of the second lens group $G_2$ and the third lens group $G_3$ in focusing. In the embodiments, the stop S is arranged to move together with the second lens group $G_2$ which is moved less.

As for a specific lens construction of the respective lens groups, the first lens group $G_1$ with a negative refractive power is comprised of a negative meniscus lens $L_1$ with a convex surface directed toward the object, and the second lens group $G_2$ with a positive refractive power is of a positive lens $L_2$, a negative meniscus lens $L_3$ with a convex surface toward the object, a double-concave negative lens $L_4$, and a double-convex positive lens $L_5$. At least one of the double-concave negative lens $L_4$ and the double-convex positive lens $L_5$ in the second lens group $G_2$ is effectively constituted as a compound lens. The both lenses can be of compound lens. The third lens group $G_3$ with a negative refractive power is composed of a negative lens $L_6$ and a positive lens $L_7$, and the fourth lens group $G_4$ with a positive refractive power is composed of a positive lens $L_8$. If the positive lens $L_8$ of the fourth lens group $G_4$ is constituted as a compound lens, a back focus may be assured while suppressing the distortion. It is also effective that the negative lens $L_6$ in the third lens group $G_3$ be formed as a compound lens. Employment of such compound lenses allows proper corrections of axial chromatic aberration and transverse chromatic aberration.

In the respective embodiments, a lens surface of the positive lens $L_7$ on the image side in the third lens group $G_3$ is aspherical, which enables a proper correction of spherical aberration difficult to be corrected in a large aperture lens.

Following Table 1 and Table 2 show specifications of the first and the second embodiment according to the present invention. In the Tables, r represents a radius of curvature of each lens surface, d a lens thickness or lens interplanar spacing, $\nu$ an Abbe number of each lens, n an index of refraction of each lens with a d line ($\lambda=587.6$ nm), f a focal length, and Bf a value for back focus. A shape of asphere is represented by the following equation. where h is a height from the optical axis, $X(h)$ a $$X(h) = \frac{h^2/r}{1 + \sqrt{1 - kh^2/r^2}} + \sum_{i=1}^{5} C_{2i} \times H^{2i},$$

distance at a height h to the optical axis along the optical axis to a tangential surface of asphere, r a paraxial curvature radius, k a conical constant, and $C_{2i}$ an asperical coefficient of 2i-th order.

TABLE 1

First Embodiment
Focal length: f = 28.6, f-number: 1.41, angle of view:
$2\omega = 75.37$ TABLE 1-continued

| | r | d | $\nu$ | n | |
|---|---|---|---|---|---|
| 1 | 66.230 | 2.00 | 64.1 | 1.51680 | $L_1$ |
| 2 | 25.126 | (variable) | | | |
| 3 | 89.207 | 4.70 | 49.4 | 1.77279 | $L_2$ |
| 4 | −164.124 | .10 | | | |
| 5 | 87.119 | 1.50 | 70.4 | 1.48749 | $L_3$ |
| 6 | 23.125 | 7.90 | | | |
| 7 | −49.577 | 9.00 | 69.9 | 1.51860 | $L_4$ |
| 8 | −15.690 | 1.50 | 54.6 | 1.51454 | |
| 9 | 462.539 | .20 | | | |
| 10 | 33.228 | 9.00 | 46.5 | 1.80411 | $L_5$ |
| 11 | −85.405 | (variable) | | | |
| 12 | −23.276 | 3.60 | 52.3 | 1.74810 | $L_6$ |
| 13 | −19.731 | 1.00 | 27.6 | 1.75520 | |
| 14 | −568.331 | 1.00 | | | |
| 15 | −122.249 | 3.50 | 49.4 | 1.77279 | $L_7$ |
| 16 | −46.473 | (variable) | | | |
| 17 | 722.991 | 9.30 | 46.5 | 1.80411 | $L_8$ |
| 18 | −21.000 | 1.50 | 23.0 | 1.86074 | |
| 19 | −28.251 | (variable) | | | |
| f/β | 28.6208 | −.1000 | | | |
| d2 | 13.9000 | 10.3752 | | | |
| d11 | 12.5500 | 12.1975 | | | |
| d16 | .5000 | .8525 | | | |
| Bf | 38.1031 | 41.6279 | | | |

16th surface (aspherical surface)

| Conical constant: | K | = | .1974E + 01 |
|---|---|---|---|
| Aspherical coefficient: | $C_2$ | = | .0000 |
| | $C_4$ | = | .1644E − 04 |
| | $C_6$ | = | .1610E − 07 |
| | $C_8$ | = | .1721E − 10 |
| | $C_{10}$ | = | −.6229E − 13 |

TABLE 2

Second Embodiment
Focal length: f = 28.8, f-number: 1.41, angle of view:
$2\omega = 74.79°$

| | r | d | $\nu$ | n | |
|---|---|---|---|---|---|
| 1 | 57.535 | 2.00 | 60.7 | 1.56384 | $L_1$ |
| 2 | 26.280 | (variable) | | | |
| 3 | 147.065 | 5.50 | 35.2 | 1.74950 | $L_2$ |
| 4 | −130.541 | .90 | | | |
| 5 | 75.309 | 1.50 | 69.9 | 1.51860 | $L_3$ |
| 6 | 22.623 | 7.50 | | | |
| 7 | −41.356 | 7.00 | 70.1 | 1.51860 | $L_4$ |
| 8 | −30.273 | 2.00 | 54.6 | 1.51454 | |
| 9 | −120.276 | .50 | | | |
| 10 | 36.871 | 12.50 | 45.4 | 1.79668 | $L_5$ |
| 11 | −38.498 | 1.50 | 25.5 | 1.80458 | |
| 12 | −72.368 | (variable) | | | |
| 13 | −23.916 | 3.60 | 45.4 | 1.79668 | $L_6$ |
| 14 | −20.165 | 1.00 | 25.8 | 1.78472 | |
| 15 | 111.431 | 1.50 | | | |
| 16 | −1275.331 | 4.00 | 49.4 | 1.77279 | $L_7$ |
| 17 | −47.358 | (variable) | | | |
| 18 | 232.678 | 1.50 | 25.4 | 1.80518 | $L_8$ |
| 19 | 170.000 | 8.30 | 46.4 | 1.80411 | |
| 20 | −30.605 | (variable) | | | |
| f/β | 28.7995 | −.1000 | | | |
| d2 | 15.8354 | 12.3752 | | | |
| d12 | 13.6007 | 13.2547 | | | |
| d17 | .6674 | 1.0034 | | | |
| Bf | 38.0996 | 41.5598 | | | |

17th surface (aspherical surface)

| Conical constant: | K | = | .2297E + 01 |
|---|---|---|---|
| Aspherical coefficient: | $C_2$ | = | .0000 |
| | $C_4$ | = | .1172E − 04 |
| | $C_6$ | = | .1692E − 07 |
| | $C_8$ | = | −.2030E − 10 |
| | $C_{10}$ | = | .5808E − 13 |

The following Table 3 shows condition values in the respective embodiments according to the present invention.

TABLE 3

| | | (condition values) Embodiment | |
|---|---|---|---|
| | Condition | 1 | 2 |
| (1) | $\Delta d_2$ | 3.5248 | 3.4602 |
| | $\Delta d_4$ | 3.5248 | 3.4602 |
| (2) | $\Delta d_3/\Delta d_2$ | 1.1 | 1.1 |
| (3) | $f_1/f$ | −2.783 | −3.050 |
| (4) | $f_3/f$ | −1.906 | −1.668 |
| (5) | $D_{1,2}/f$ | 0.485 | 0.550 |
| (6) | $D_{2,3}/f$ | 0.438 | 0.472 |

Figure 2:
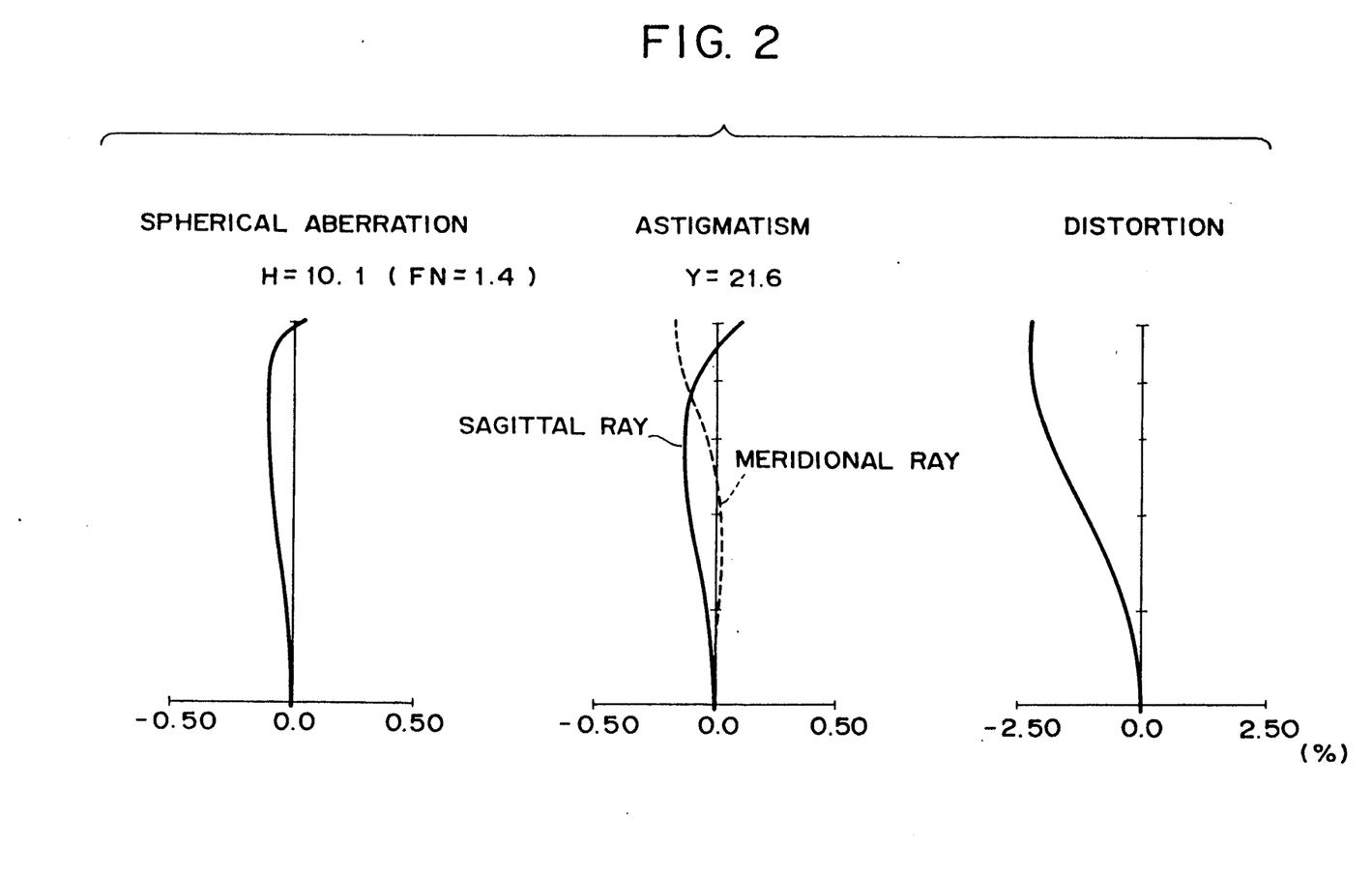
FIG. 2 is a drawing to show aberrations in an infinity focus state in the first embodiment.
Figure 3:
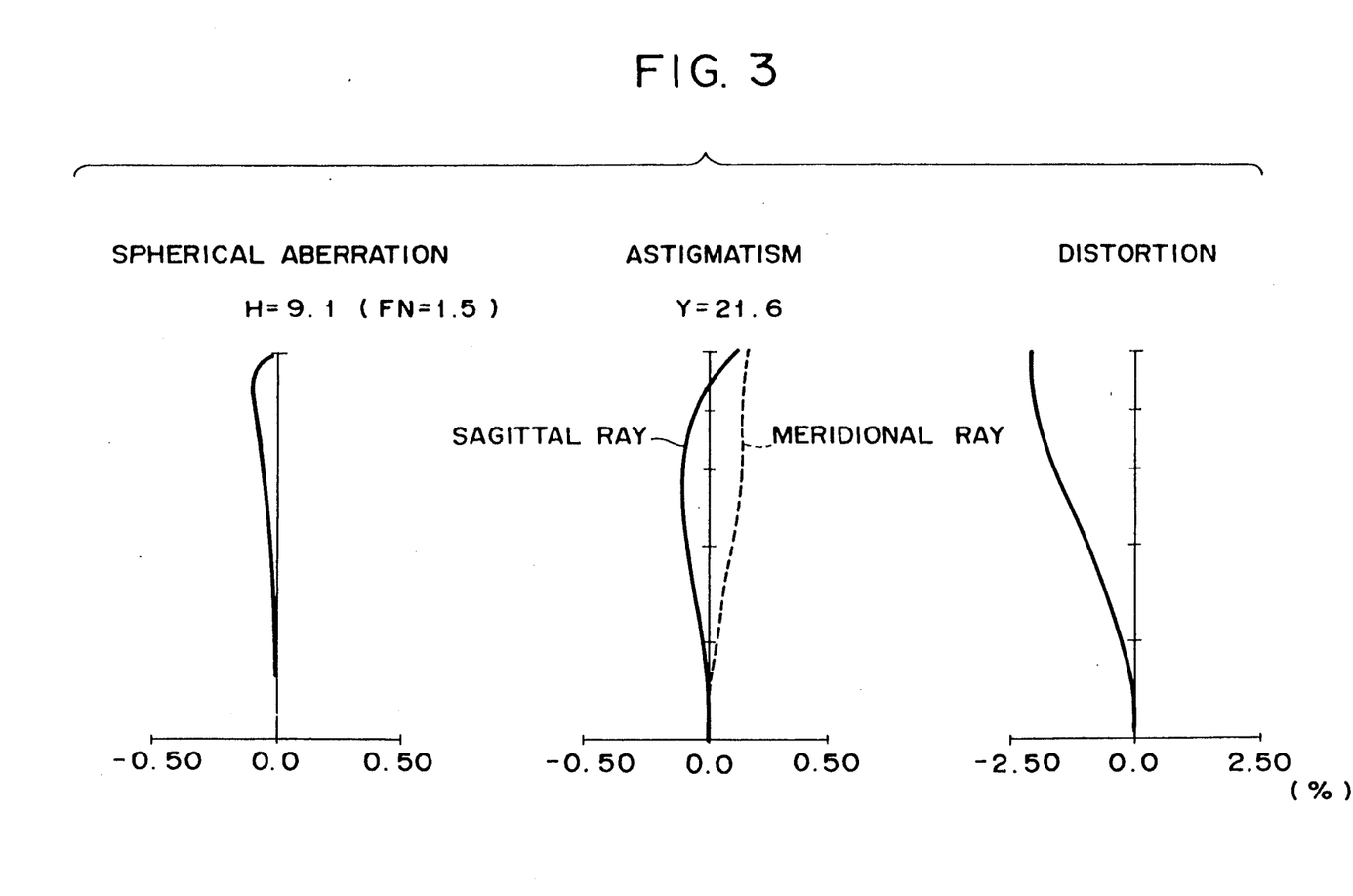
FIG. 3 is a drawing to show aberrations in a state of short range focus at a photographic magnification of $\beta = -1/10$ in a focusing method according to the present invention in the first embodiment.
Figure 4:
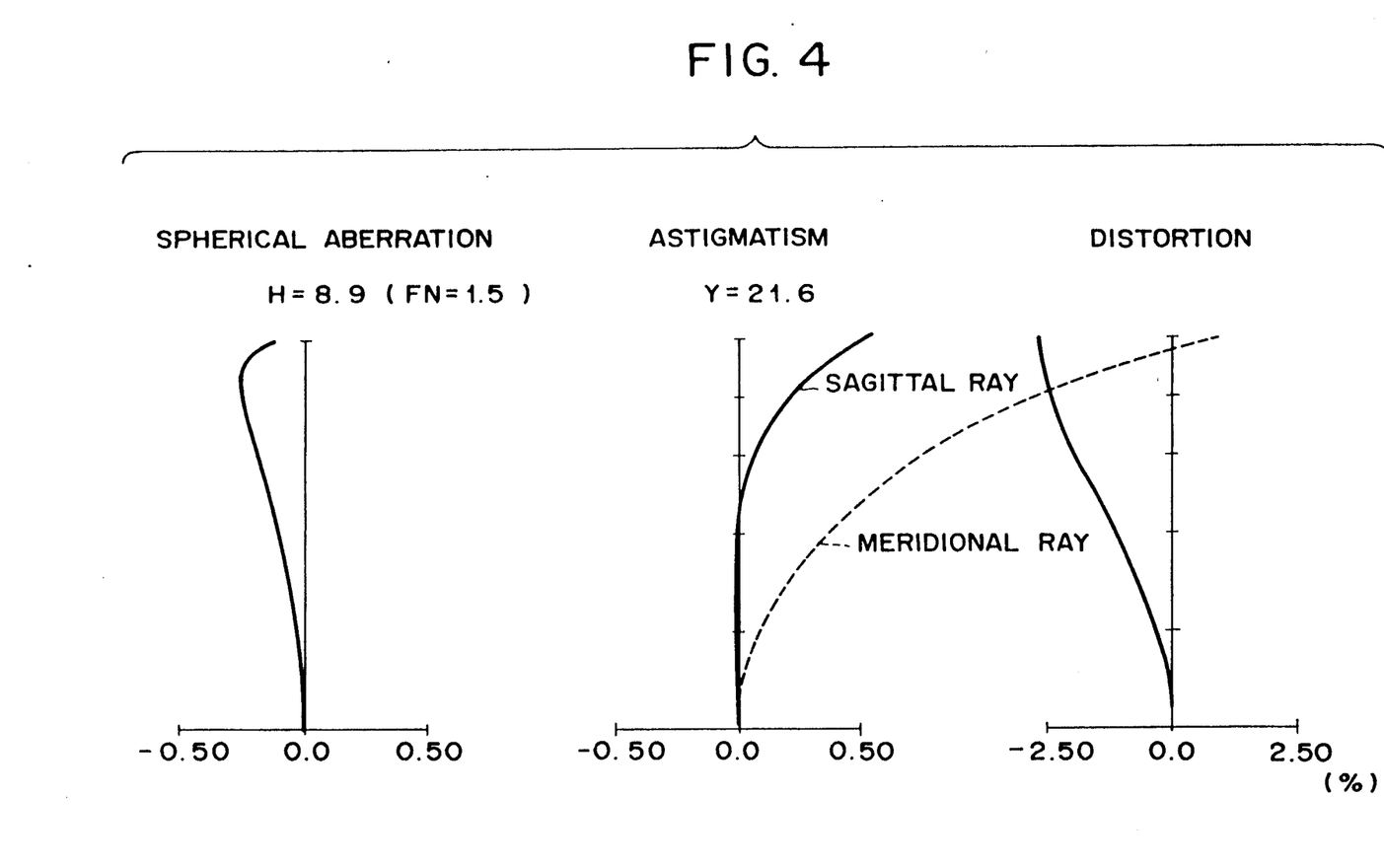
FIG. 4 is a drawing to show aberrations in a state of short range focus at a photographic magnification of $\beta = -1/10$ in which the entire lens system is moved together in the first embodiment as in a conventional lens.
Figure 6:
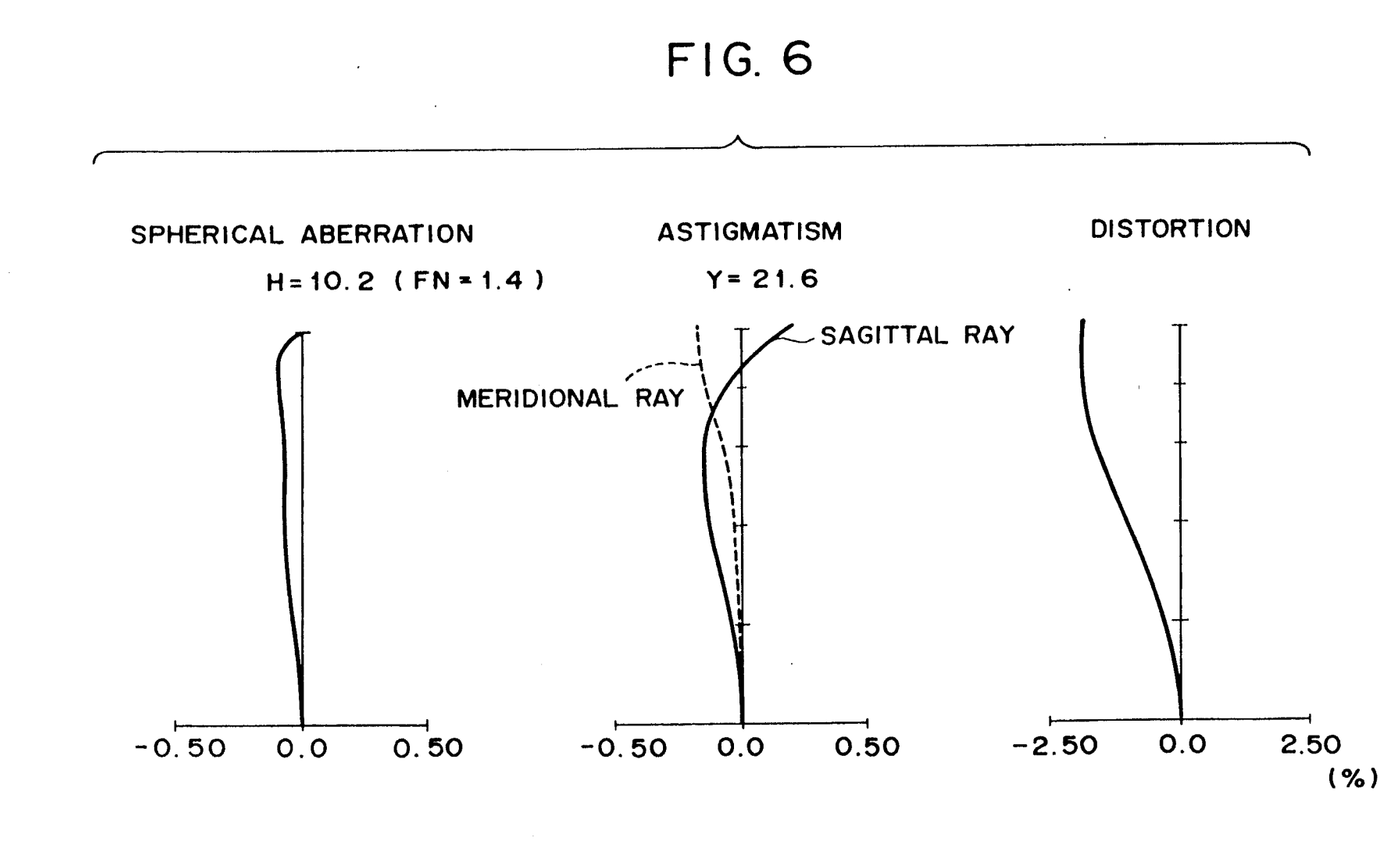
FIG. 6 is a drawing to show aberrations in an infinity focus condition in the second embodiment.
Figure 7:
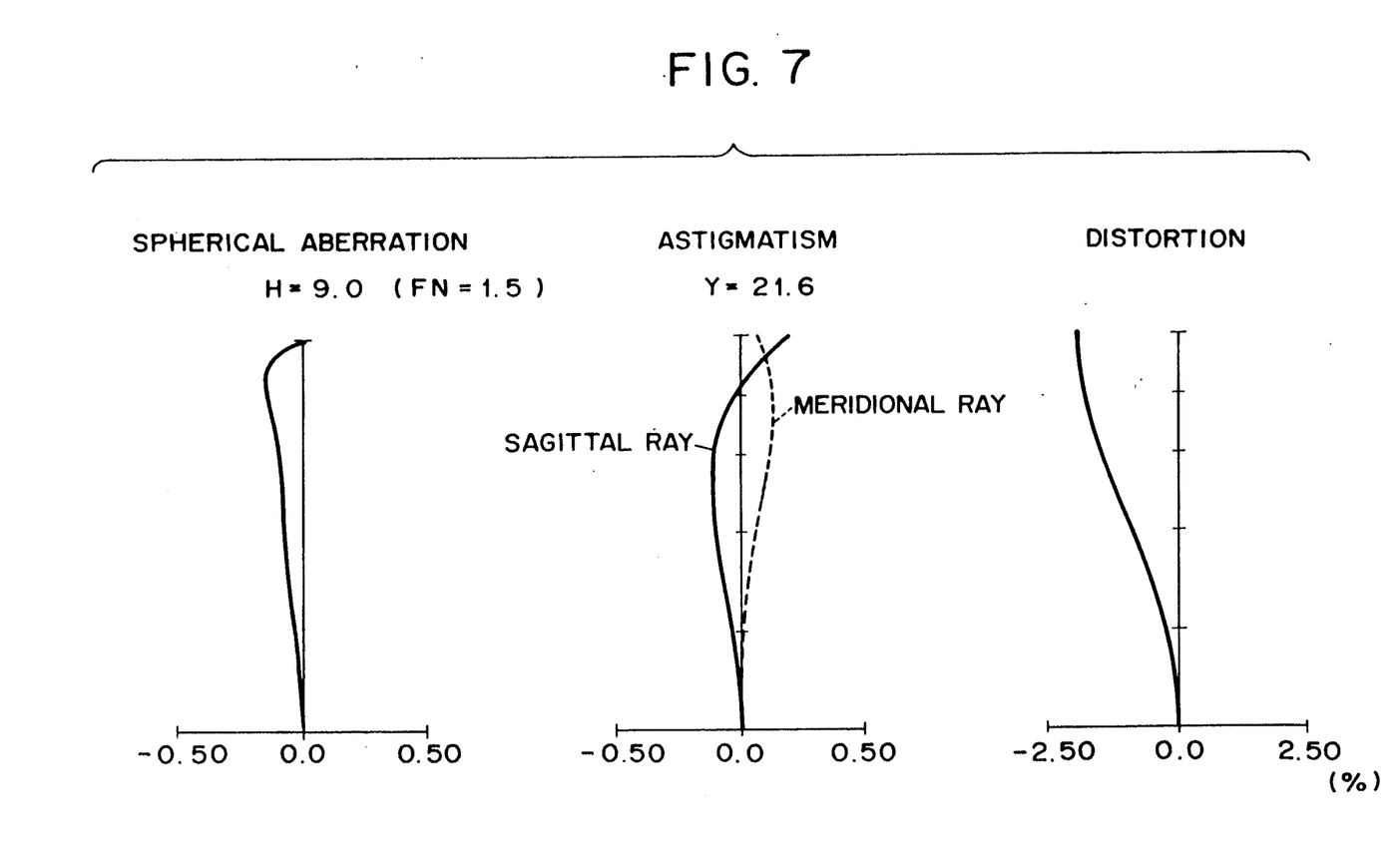
FIG. 7 is a drawing to show aberrations in a state of short range focus at a photographic magnification of $\beta = -1/10$ in a focusing method according to the present invention in the second embodiment.
Figure 8:
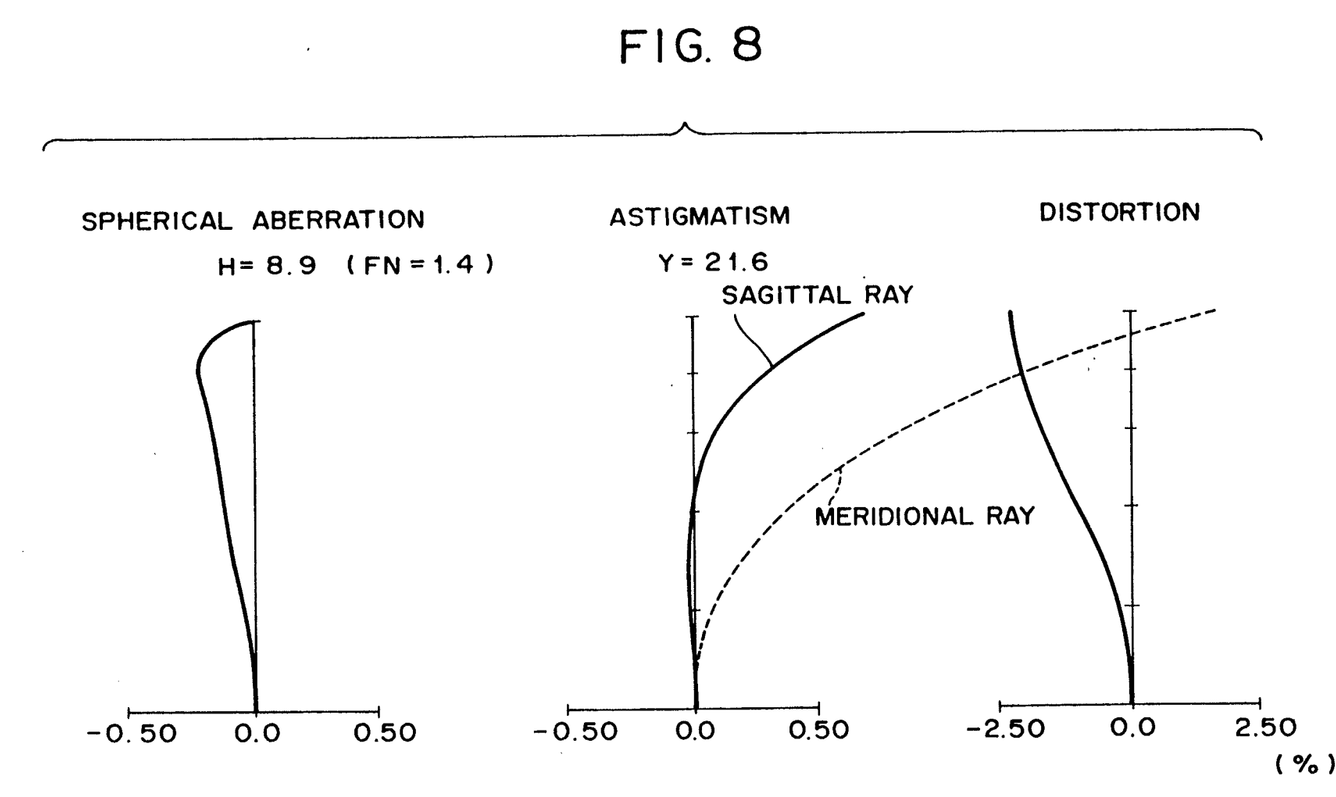
FIG. 8 is a drawing to show aberrations in a state of short range focus at a photographic magnification of $\beta = -1/10$ in which the entire lens system is moved together in the second embodiment as in the conventional lens.

FIG. 2 is a drawing to show various aberrations in an infinity focus condition in the above first embodiment, FIG. 3 is a drawing to show various aberrations in a state in which a near focus is carried out at a photographic magnification of $\beta = -1/10$ in the focusing method according to the present invention, and FIG. 4 is a drawing to show various aberrations in a state in which a near focus is carried out at the same magnification by integrally moving the entire lens system as in the conventional lens. Similarly, FIG. 6 is a drawing to show various aberrations in the infinity focus condition in the second embodiment, FIG. 7 is a drawing to show various aberrations in a state in which a near focus is carried out at a photographic magnification of $\beta = -1/10$ in the focusing method according to the present invention, and FIG. 8 is a drawing to show various aberrations in a state in which a near focus is carried out at the same magnification by integrally moving the entire lens system as in the conventional lens.

It is clear from comparison of the aberration drawings that the inverse telephoto large aperture wide angle lens of the present invention has an excellent imaging performance from infinity to short range photography with an angle of view of about 74 degrees and an f-number of 1.4. It is seen that the improvement in aberrations is specifically remarkable in focusing at a near distance.

What is claimed is:

1. An inverse telephoto large aperture wide angle lens comprising a first lens group with a negative refractive power, a second lens group with a positive refractive power, a stop, a third lens group with a negative refractive power, and a fourth lens group with a positive refractive power arranged in the order from an object side, wherein for focusing on a near object from infinity said first lens group is fixed with respect to an image surface, and said second, third, and fourth lens groups are moved along an optical axis thereof toward said object such that a space between said first lens group and said second lens group and a space between said second lens group and said third lens group decrease, but a space between said third lens group and said fourth lens group increases.

2. An inverse telephoto large aperture wide angle lens according to claim 1, wherein the following conditions are satisfied for movement for focusing of said second, third, and fourth lens groups moved on the optical axis:

$$\Delta d_2 = \Delta d_4;$$

$$0 < \Delta d_3/\Delta d_2 < 1.3,$$

where $\Delta d_2$ represents an amount of movement for focusing of said second lens group with respect to an infinity focus, $\Delta d_3$ an amount of movement for focusing of said third lens group with respect to the infinity focus, and $\Delta d_4$ an amount of movement for focusing of said fourth lens group with respect to the infinity focus.

3. An inverse telephoto large aperture wide angle lens according to claim 2, wherein the following conditions are further satisfied:

$$-4 < f_1/f < -2;$$

$$-3 < f_3/f < -1.2;$$

$$0.35 < D_{1,2}/f < 0.65;$$

$$0.35 < D_{2,3}/f < 0.5,$$

where $f_1$ is a focal length of said first lens group, $f_3$ a focal length of said third lens group, $f$ a focal length of overall lens system, $D_{1,2}$ an air space between the first lens group and the second lens group at the infinity focus, and $D_{2,3}$ an air space between the second lens group and the third lens group at the infinity focus.

4. A large aperture wide angle lens comprising a first lens group with a negative refractive power, a second lens group with a positive refractive power, a third lens group with a negative refractive power, and a fourth lens group with a positive refractive power arranged in the order from an object side, wherein for focusing on a near object from infinity said first lens group is fixed with respect to an image surface, and said second, third, and fourth lens groups are moved along an optical axis thereof toward said object.

5. A large aperture wide angle lens according to claim 4, wherein said second, third and fourth lens groups are moved along the optical axis for focusing on a nearer object such that a space between said first lens group and said second group and a space between said second lens group and said third lens group decrease, but a space between said third lens group and said fourth lens group increases.

6. A large aperture wide angle lens according to claim 5, further comprising a stop disposed between first lens group and said fourth lens group.

* * * * *